UNITED STATES PATENT OFFICE 2,571,990

AZO DYEING PROCESS FOR CELLULOSE FIBERS

Charles Howard Stratton, Phillipsburg, N. J., assignor to General Aniline & Film Corporation, New York, N. Y., a corporation of Delaware No Drawing. Application December 30, 1947, Serial No. 794,778

5 Claims. (Cl. 8—46)

This invention relates to a process for dyeing cellulosic fiber and textile materials containing the same, involving formation of insoluble azo dyes thereon, as well as to the dyestuffs and dyed materials formed in the process.

In the direct dyeing of cotton and other cellulosic fibers, or textile materials containing the same, water-soluble substantive or direct dyestuffs, particularly polyazo dyestuffs such as those derived from tetrazotized diamino-diaryl compounds (e. g., benzidine and its substitution products) are commonly employed. Such dyestuffs generally contain sulfo groups or similar acidic water-solubilizing groups which render them water-soluble and permit their application to the textile material from an aqueous dye bath. However, since the dyestuff absorbed by the fiber still contains sulfonic acid groups or similar water-solubilizing groups, and therefore remains water-soluble as such, the colorations produced are generally characterized by unsatisfactory fastness to washing. Some improvement in wash-fastness is obtained by employing a direct or substantive dyestuff containing diazotizable amino groups, diazotizing the latter on the fiber and coupling with a coupling component such as β-naphthol which contains no acidic water-solubilizing groups. The increased molecular size of the dyestuff on the fiber results in an improvement in fastness to washing of the resulting coloration, but since the solubilizing groups contained in the original dyestuff are retained in the final coloration, the latter is still defective in fastness to washing.

A number of methods have been proposed heretofore for producing colorations on cellulosic fiber having greatly improved fastness to washing, involving application to the fiber of dyestuffs or intermediates therefor, containing water-solubilizing groups or radicals which are split off by a subsequent treatment of the dyed material to yield colorations of greatly improved fastness to washing, by reason of the absence or reduction in number of the water-solubilizing groups in the dyestuff molecule.

Among others it has been suggested, for example, to apply a dyestuff derived from a tetrazotized benzidine compound and α-naphthyl sulfamic acid to vegetable fiber (such dyestuffs having direct affinity for said fiber), then subjecting the dyestuff on the fiber to diazotization with a large excess of mineral acid and sodium nitrite, whereby the sulfamic acid groups are converted to diazo groups; and finally, developing in the known manner by treatment with an aqueous solution of a suitable coupling component. By employing a coupling component containing no acidic solubilizing groups, a water-insoluble dyestuff can be formed on the fiber by this method, the resulting coloration possessing excellent fastness to washing.

I have discovered that certain polyazo compounds having terminal phenyl sulfamic acid radicals and containing no other acid solubilizing groups in the molecule, yield direct dyeings from aqueous alkaline to neutral solutions on cellulosic fiber, such as cotton or regenerated cellulose rayon, which can be diazotized on the fiber to convert the sulfamic acid groups to diazo groups, and finally developed with a coupling component likewise lacking in acidic solubilizing groups to yield dyeings of outstanding fastness to washing.

The polyazo compounds which can be employed in accordance with my invention for direct application to cellulosic fiber, and wherein the sulfamic acid groups are susceptible to cleavage to form diazo groups by treatment on the fiber with nitrous acid have the following general formula in free acid form:

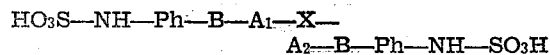

wherein $A_1$ and $A_2$ are phenylene radicals; X is a member of the class consisting of a single valence bond and an acyclic atomic bridge interconnecting the radicals $A_1$ and $A_2$; Ph—NH—SO$_3$H is a phenyl sulfamic acid radical; and B represents an azo coupling component radical having an azo group attached thereto in coupling position and containing an —N—CO— group, the adjacent A radical being attached to a nitrogen atom of one of said groups, and the other of said groups being attached to the adjacent phenyl sulfamic acid radical in one of the positions meta and para to the sulfamic acid group.

In the foregoing formula, the phenylene radicals $A_1$ and $A_2$ can be unsubstituted or may contain non-solubilizing nuclear substituents such as halogen, alkoxy or alkyl groups.

The acyclic atomic bridge radicals represented by X include such groups as NHCONH—, —CO—NH—,

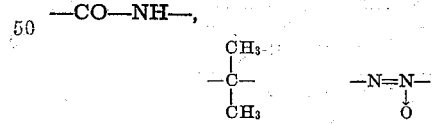

—CH=CH— and the like.

B represents, for example, such radicals as the following:

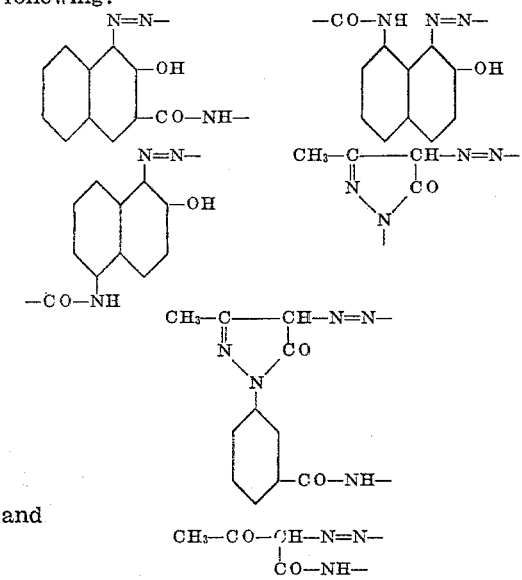

and

Thus, the group —N—CO— can be either an exo-nuclear carboxy-amido group, or may constitute a linkage in a heterocyclic ring, e. g., a pyrazolone ring. The nitrogen as well as the carbonyl of the —N—CO— group forms an integral part of a linkage within the radical B interconnecting the radical Ph with the adjacent radical A₁ or A₂.

The preferred coupling component radicals represented by B are particularly a 1-azo-2-hydroxy-3-naphthoylamino radical, an α-azo-β-aceto-acetylamino radical and a 4-azo-5-pyrazolonyl radical.

The radicals represented by B can be respectively attached to the phenylene radicals A₁ and A₂ in similar positions relative to X (e. g., the para positions respectively) or in different positions (e. g., the para and meta positions respectively). Thus, in the above general formula, the grouping —A₁—X—A₂— may represent, for example, the following radicals:

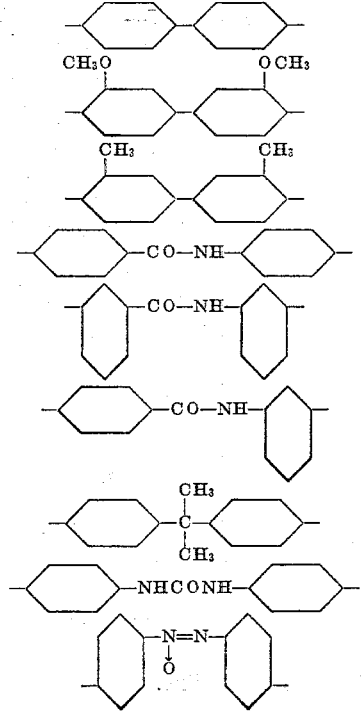

The phenyl sulfamic acid radical

—PH—NH—SO₃H may contain additional non-solubilizing nuclear substituents such as halogen, alkyl, and alkoxy groups, but is preferably unsubstituted.

The polyazo compounds of the aforesaid general formula are soluble in aqueous solutions, yielding baths from which textile materials made of cellulosic fibers such as cotton or regenerated cellulose rayon can be dyed directly. The dyeing is preferably carried out under alkaline to neutral conditions. By diazotizing the dyestuff on the fiber, the sulfamic acid groups are converted to diazo groups which can be coupled with coupling components such as β-naphthol, 1-phenyl-3-methyl-5-pyrazolone, m-toluylene diamine, or others containing no acidic water-solubilizing groups, to yield dyeings of exceptionally outstanding fastness to washing.

The process heretofore known and mentioned above, wherein a disazo dyestuff obtained by coupling a tetrazotized benzidine compound with α-naphthyl sulfamic acid is applied to vegetable fiber, diazotized thereon and coupled with a further coupling component, is subject to the disadvantage that conversion of the sulfamic acid groups of the parent disazo compounds to diazo groups is relatively difficult. I have found that such compounds require a large excess of strong mineral acid in the nitrous acid solution applied to the dyed material in order to effect satisfactory conversion of the sulfamic acid groups to diazo groups. The mineral acid thus employed has a tendency to corrode the equipment as well as to attack and weaken the fiber, and therefore requires special precautions in its application which are relatively inconvenient in commercial practice.

While certain of the intermediate polyazo compounds corresponding to the general formula set out above require treatment with nitrous acid containing an excess of strong mineral acid to effect satisfactory diazotization of the sulfamic acid groups therein, I have discovered that the sulfamic acid groups in the polyazo compounds corresponding to the above general formula, wherein the azo group or the carbonyl of said —N—CO— group in the radical represented by B, is attached to the phenyl sulfamic acid radical in meta position rather than in para position, and also those compounds in which the nitrogen of said —N—CO— group is attached to one of the positions meta and para to the sulfamic acid group in the phenyl sulfamic acid radical, can be readily converted to diazo groups on the fiber by treatment with diazotizing solutions in the same manner as is usual with fibers which have been dyed with ordinary direct diazo colors, i. e., by treatment with aqueous nitrous acid containing no substantial excess of strong mineral acid and without any other drastic or unusual treatment. Thus, the diazotization of compounds corresponding to the foregoing general formula having the aforesaid specific structure constitutes a preferred class of materials for use in accordance with this invention which can be applied, diazotized, and developed on the fiber without risking injury to the goods or excessive corrosion of the dyeing equipment. Subsequent development of these diazotized compounds on the fiber with a water-insoluble azo coupling component yields a coloration having outstanding fastness to washing.

The polyazo compounds of the foregoing general formula are soluble in aqueous alkaline to neutral solutions and are stable therein at temperatures up to 100° C. They are also soluble and reasonably stable in cold dilute aqueous acid solutions. The solubility of these compounds in water is due to the presence of the sulfamic acid radicals in the terminal nuclei.

In applying the dyestuffs of this invention to cellulosic fiber, the material is treated with an aqueous solution of the parent dyestuff by the procedure commonly employed in direct dyeing of vegetable fibers. The aforesaid dyestuffs have substantivity toward cellulosic fibers and are therefore readily taken up by the fiber from aqueous solution.

In order to convert the sulfamic acid groups of the dyestuff on the fiber to diazo groups, the fiber is treated with an aqueous solution of nitrous acid containing excess strong mineral acid such as hydrochloric acid or sulfuric acid, if need be, but in the case of the preferred class of dyestuffs described above which also correspond to the foregoing general formula, such diazotization is carried out with a solution of nitrous acid containing a slight excess of strong mineral acid. After diazotization, the final coloration is developed by treatment with a suitable coupling component containing no acidic solubilizing group, in aqueous solution. Such coupling components include β-naphthol and 1-phenyl-3-methyl-5-pyrazolone in aqueous alkaline solution, or m-tolylene diamine in aqueous acetic acid solution. Such development results in the formation of a water-insoluble polyazo dyestuff on the fiber which possesses outstanding fastness to washing.

The dyestuffs produced on the fiber have the general formula:

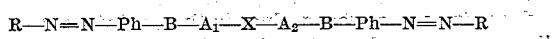

where R signifies the radical of an azo coupling component having no acidic water-solubilizing groups, and the radicals R—N=N— replace the sulfamic acid groups in the formula given above for the parent polyazo compound, Ph, B, A₁, A₂ and X having the same significance in both formulae.

The following examples, wherein parts and percentages are by weight, illustrate the process of dyeing cellulosic fiber in accordance with my invention, and a number of dyestuffs produced by said process.

*Example 1*

Cotton cloth is dyed in the manner commonly employed for direct cotton dyestuffs with an aqueous solution of a disazo dyestuff having the following formula:

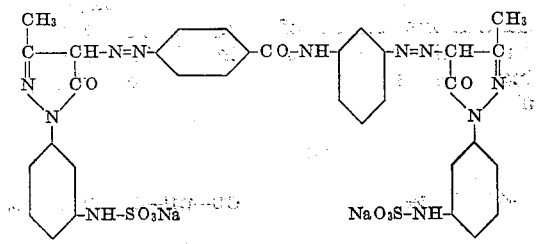

prepared, for example, by tetrazotizing N-p'-aminobenzoyl)-m-phenylene diamine, and coupling with two molecular equivalents of 1-(m-sulfaminophenyl)-3-methyl-5-pyrazolone in alkaline solution. A yellow dyeing is obtained. 5 parts of the dyed cloth thus obtained were treated with an aqueous nitrous acid bath prepared by adding 0.25 part of concentrated sulfuric acid to a solution of 0.15 part of sodium nitrite in 200 parts of water. The sulfamic acid groups in the dyestuff contained on the fiber are thereby converted to diazo groups, and upon treating the fiber, after diazotization, with an alkaline bath containing 0.25 part of β-naphthol in 200 parts of water, an orange dyeing of unusual fastness to washing was obtained. The finished dyestuff has the following formula:

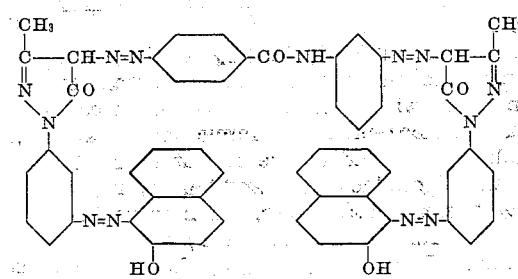

Upon substituting disazo compounds obtained by coupling 1 mol of tetrazotized p,p'-diaminodiphenyl-dimethyl-methane, tetrazotized p,p'-diamino azoxybenzene, or N-(p'-aminobenzoyl)-p-phenylene diamine with two mols of 1-(m-sulfaminophenyl)-3-methyl-5-pyrazolone in alkaline solution, for the disazo compound initially employed in the foregoing example, yellow colorations were produced initially on cotton fiber, which, after diazotization and further coupling with β-naphthol, in the manner described in this example, also yielded orange shades of outstanding fastness to washing.

*Example 2*

Cotton fabric was dyed by the same procedure as in Example 1 with an aqueous solution of a disazo dyestuff having the following formula:

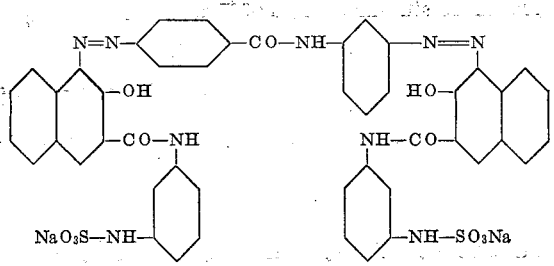

obtained by coupling 1 mol of tetrazotized N-(p'-aminobenzoyl)-m-phenylene diamine with 2 mols of m-(2-hydroxy-3-naphtholyamino)-phenyl sulfamic acid in alkaline solution. A red shade was produced. Upon treatment with an aqueous solution of nitrous acid prepared as described in Example 1, and coupling the diazotized compound on the fiber with β-naphthol applied in aqueous alkaline solution, a red dyeing of outstanding fastness to washing was obtained. The resulting dyestuff has the following formula:

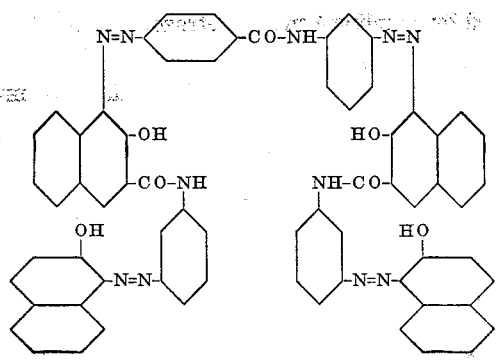

Upon substituting tetrazotized N-(m'-aminobenzoyl)-m-phenylene diamine for the tetrazotized N-p'-aminobenzoyl - m - phenylene diamine in preparing the intermediate disazo compound of this example, a pink shade is first produced on the cotton, which yields a red coloration of similarly outstanding fastness to washing upon diazotization and coupling on the fiber with β-naphthol by the same procedure as in Example 1.

Disazo compounds obtained by coupling 1 mol of tetrazotized benzidine or 1 mol of tetrazotized o-dianisidine with 2 mols of m-(2-hydroxy-3-naphthoylamino)-phenyl sulfamic acid in alkaline solution, instead of the parent dyestuff of this example, produce violet and blue dyeings respectively on the cotton fiber, which, upon diazotization and further coupling with β-naphthol as described in Example 1, yield gray shades of outstanding fastness to washing.

By substituting a disazo compound obtained by coupling 1 mol of tetrazotized N-(p'-aminobenzoyl)-m-phenylene diamine with 2 mols of m-acetoacetylamino-phenyl sulfamic acid in alkaline solution, for the parent disazo dyestuff of this example, a yellow shade was initially obtained on the cotton, which upon diazotization on the fiber and coupling with β-naphthol as described in Example 1, yielded an orange shade; or if similarly coupled with 1-phenyl-3-methyl-5-pyrazolone, yielded a yellow shade; both colorations having outstanding fastness to washing.

*Example 3*

Cotton cloth was dyed, employing a direct dyeing procedure similar to that of Example 1, in an aqueous bath containing a disazo dyestuff having the following formula:

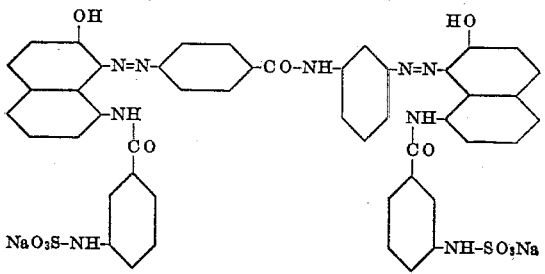

obtained by coupling 1 mol of tetrazotized N-(p'-aminobenzoyl)-m-phenylene diamine with 2 mols of N - (m-sulfamino-benzoyl)-8-amino-2-naphthol (the latter compound being obtained, for example, by reaction of sodium bisulfite with N-(m-nitrobenzoyl)-8-amino- 2 - naphthol). The material was thereby dyed a violet shade. The dyestuff was diazotized on the fiber by treatment with a nitrous acid solution prepared as described in Example 1, and then coupled with β-naphthol applied in an aqueous alkaline bath. A red shade was thus obtained having outstanding fastness to washing. The resulting dyestuff has the following formula:

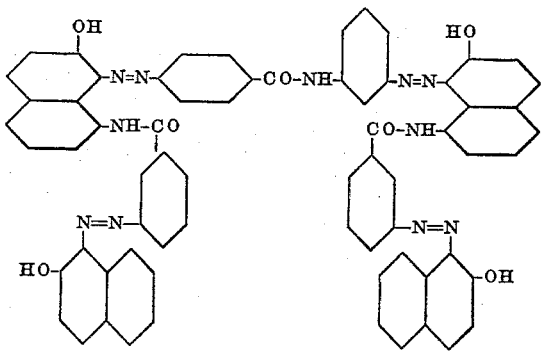

By substituting N-(m-sulfamino-benzoyl)-5-amino-2-naphthol for the corresponding 8-amino-2-naphthol derivative in preparing the parent dyestuff, and applying the resulting compound as described in this example, a bluish red shade is first produced on cotton, which upon coupling on the fiber with β-naphthol, likewise yields a red shade having similarly excellent fastness properties.

*Example 4*

Cotton cloth was dyed by a direct dyeing procedure in an aqueous dye bath containing a disazo compound having the following formula:

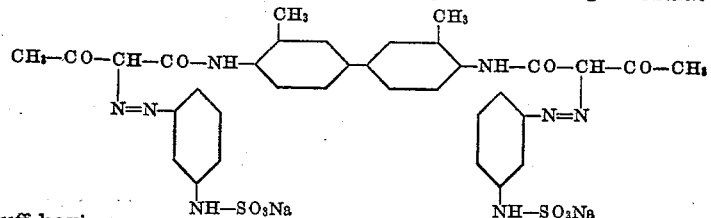

prepared by coupling 2 mols of diazotized m-aminophenyl sulfamic acid with N,N'-bis-acetoacetyl o-tolidine in alkaline solution. The cotton material was thereby dyed in a yellow shade. The dyed material was then treated with a nitrous acid bath prepared as described in Example 1 to diazotize the dyestuff on the fiber, and developed with an alkaline solution of β-naphthol, yielding an orange shade of outstanding fastness to washing. The resulting dyestuff has the following formula:

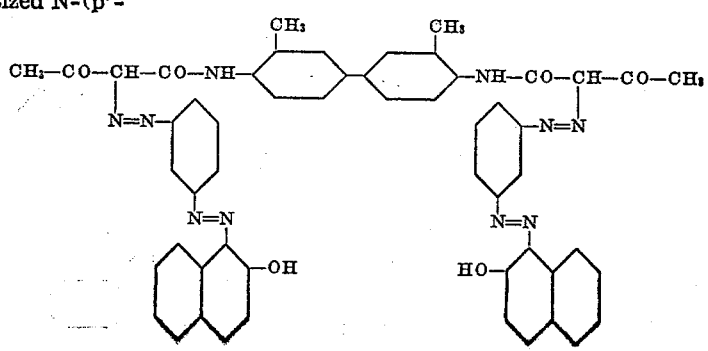

Upon substituting 1-phenyl-3-methyl-5-pyrazolone for β-naphthol in the final development, a yellow shade of similar fastness properties is produced.

Example 5

Cotton cloth was dyed by a direct dyeing procedure in an aqueous dye bath containing a disazo compound having the following formula:

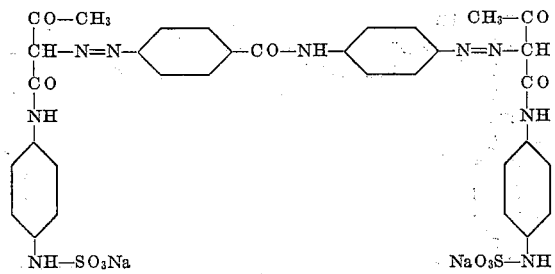

prepared by coupling tetrazotized N-(p'-aminobenzoyl)-p-phenylene diamine with p-acetoacetamido-phenyl sulfamic acid in alkaline solution. The material was dyed a yellow shade. Upon diazotization on the fiber with a nitrous acid solution as described in Example 1, and development with an alkaline solution of β-naphthol, a red shade of outstanding fastness to washing was produced upon the material. The resulting dyestuff had the following formula:

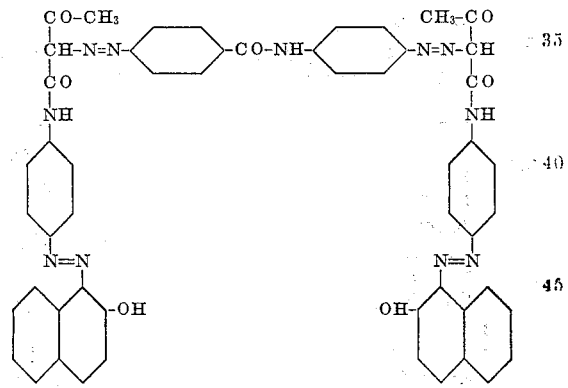

By substituting 1-phenyl-3-methyl-5-pyrazolone for β-naphthol in the final development, a yellow shade of similar fastness properties was produced.

By employing a disazo compound prepared as described in this example, except that tetrazotized N-(p'-aminobenzoyl)-m-phenylene diamine was employed instead of the corresponding p-phenylene diamine derivative, a greenish yellow shade was initially produced on the cotton cloth which yielded respectively red and yellow shades upon diazotization and development with β-naphthol and 1-phenyl-3-methyl-5-pyrazolone by the procedure described above. Likewise, when tetrazotized benzidine is substituted for the aforesaid tetrazotized aminobenzoyl phenylene diamines in preparing the parent disazo compound, a yellow shade is produced on the cotton material in the initial direct dyeing step, and red and yellow shades are respectively produced by similar diazotization on the fiber and development with β-naphthol and 1-phenyl-3-methyl-5-pyrazolone.

The corresponding disazo dyestuff from tetrazotized o-dianisidine yields an orange shade in the initial direct dyeing step, and upon diazotization on the fiber as described above and coupling with β-naphthol or 1-phenyl-3-methyl-5-pyrazolone yields red and orange shades respectively.

By substituting p-(2-hydroxy-3-naphthoylamino)-phenyl sulfamic acid for p-acetoacetamido phenyl sulfamic acid in preparing the parent disazo compound of this example, a dyestuff is obtained yielding bluish red shades on cotton in the initial direct dyeing step, as well as bluish red shades of outstanding fastness to washing upon diazotization on the fiber and development as described in Example 1 with an aqueous alkaline solution of β-naphthol.

In the parent disazo dyestuffs of the foregoing examples the phenyl sulfamic acid radicals are attached in meta or para position to the nitrogen atom of the —N—CO— group of radical B in the general formula set out above, or when attached to the azo group or to the carbonyl of the —N—CO— group of radical B, the phenyl sulfamic acid radicals are attached thereto in meta position with reference to the sulfamic acid group. Accordingly, each of the parent disazo compounds of the foregoing examples belongs to the preferred class within the scope of the general formula given above, and can be diazotized on the cellulosic fiber with nitrous acid in the absence of any substantial excess of strong mineral acid. Hence, possible injury to the fiber and equipment is avoided.

The following examples illustrate a suitable procedure for application of dyestuffs within the scope of the invention, wherein the azo group or the carbonyl group of the —N—CO— group in the B radicals is attached in para position to the sulfamic acid groups in the phenyl sulfamic acid radicals of the parent disazo compound.

Example 6

Cotton cloth was treated in an aqueous dye bath by a direct dyeing procedure with a disazo compound having the following formula:

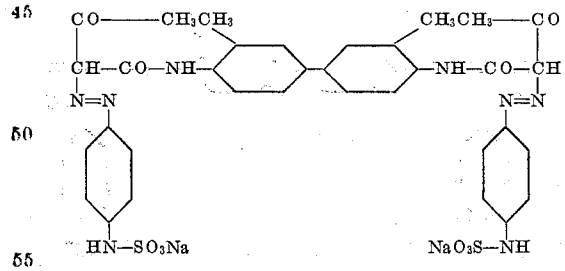

obtained by coupling 2 mols of p-diazophenyl sulfamic acid with 1 mol of N,N'-bis-acetoacetyl-o-tolidine in alkaline solution. 5 grams of the cloth, which was colored yellow by the foregoing treatment, was then treated with a solution of 11.8 parts of 36% hydrochloric acid and 1 part of sodium nitrite in 190 parts of water, whereby the sulfamic acid radicals of the parent dyestuff were converted to diazo groups. The diazotizing solution contained in addition to nitrous acid a substantial excess of hydrochloric acid. Subsequent treatment with an aqueous alkaline solution of β-naphthol yields a violet shade; or treatment with an aqueous alkaline solution of 1-phenyl-3-methyl-5-pyrazolone yields an orange shade; or an aqueous acetic acid solution of m-toluylene diamine yields a brown shade, each of said colorations having excellent fastness to washing.

The dyestuff obtained with β-naphthol has the following formula:

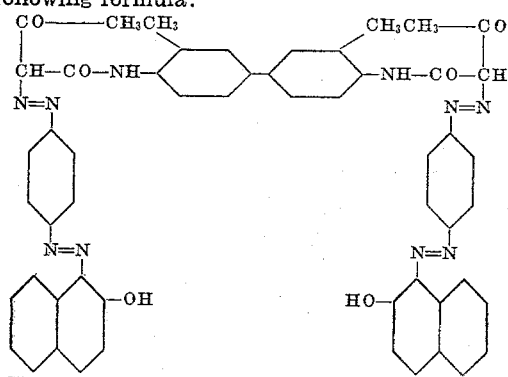

When N,N'-bis-2-hydroxy-3-naphthoyl-o-dianisidine is employed in preparing the parent disazo compound instead of N,N'-bis-acetoacet-o-tolidine, the initial dyeing treatment yields a red violet shade on cotton, which after diazotization on the fiber by the method of this example, and coupling with β-naphthol, 1-phenyl-3-methyl-5-pyrazolone, or m-toluylene diamine as described above, yields respectively blue, brown and gray shades of exceptional fastness to washing.

*Example 7*

Cotton fabric was dyed by a direct dyeing procedure in an aqueous dye bath containing a disazo compound of the following formula:

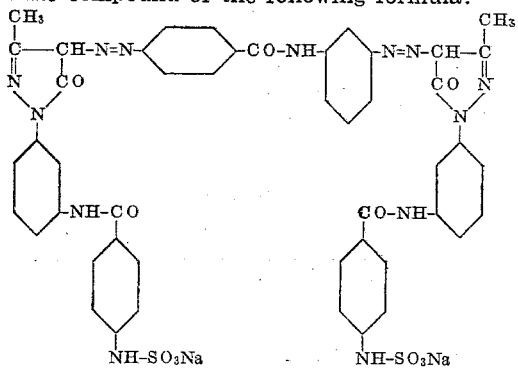

obtained by coupling 1 mol of N-(p'-aminobenzoyl)-m-phenylene diamine with 2 mols of 1-(3' - p - sulfaminobenzoylamino - phenyl) - 3 - methyl-5-pyrazolone. The cotton was dyed in a yellow shade which, upon diazotization on the fiber by the method of Example 6 and coupling with β-naphthol in alkaline solution, yielded an orange coloration of excellent fastness to washing. The formula of the resulting dyestuff is as follows:

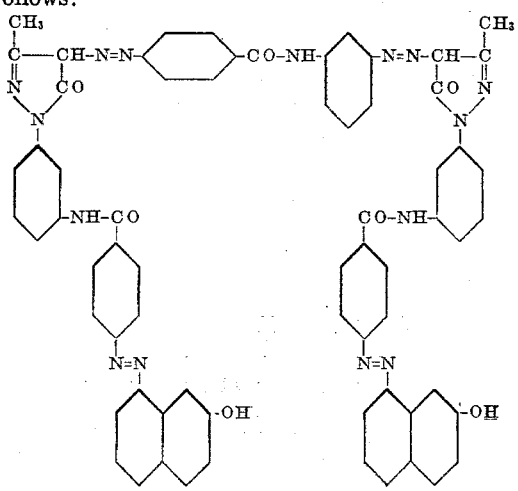

Upon substituting 8 - (p - sulfaminobenzoyl - amino)-2-naphthol for the 1-(p-sulfaminobenzoyl-aminophenyl)-3-methyl-5-pyrazolone of this example in preparing the parent disazo dyestuff initially applied to the material, the initial coloration is bluish red, and upon diazotization and development on the fiber with β-naphthol, a red coloration of equally outstanding fastness to washing is obtained.

All of the colorations produced in accordance with the foregoing examples possess outstanding fastness to washing since the dyestuffs produced on the fiber contain no acidic water-solubilizing groups such as sulfonic acid groups or carboxy acid groups.

The foregoing examples are illustrative but not limitative, and variations and modifications in the constitution of the dyestuffs of my invention as well as in the details of the dyeing process for producing them on the fiber, which will be obvious to those skilled in the art, can be made without departing from the scope or nature of this invention.

I claim:

1. A process for producing a coloration on cellulosic fiber of outstanding fastness to washing, which comprises dyeing said fiber directly with an aqueous solution of a polyazo compound having in free acid form the following general formula:

$$HO_3S-NH-Ph-B-A_1-X-A_2-B-Ph-NH-SO_3H$$

wherein $A_1$ and $A_2$ represent phenylene radicals; X is a member of the class consisting of a single valence bond and an acyclic atomic bridge interconnecting the radicals $A_1$ and $A_2$; —Ph—NH—SO₃H is a phenyl sulfamic acid radical; and B represents an azo coupling component radical having an azo group attached thereto in coupling position and containing an —N—CO— group, the adjacent A radical being attached to a nitrogen atom of one of said groups, and the other of said groups being attached to the phenyl sulfamic acid radical in one of the positions meta and para to the sulfamic acid group, said compound containing no acidic water-solubilizing group other than said sulfamic acid group; treating the resulting dyed material with a diazotizing solution to convert said sulfamic acid groups on the fiber to diazo groups, and developing with an aqueous solution of an azo coupling component containing no acidic water-solubilizing groups.

2. A process for producing a coloration on cellulosic fiber of outstanding fastness to washing, which comprises dyeing said fiber directly with an aqueous solution of a polyazo compound having in free acid form the following general formula:

$$HO_3S-NH-Ph-B-A_1-X-A_2-B-Ph-NH-SO_3H$$

wherein $A_1$ and $A_2$ represent phenylene radicals; X is a member of the class consisting of a single valence bond and an acyclic atomic bridge interconnecting the radicals $A_1$ and $A_2$; —Ph—NH—SO₃H is a phenyl sulfamic acid radical; and B represents an azo coupling component radical having an azo group attached thereto in coupling position and containing an —N—CO— group, the adjacent A radical being attached to a nitrogen atom of one of said groups, and the adjacent —Ph—NH—SO₃H radical being attached to the other of said groups in such manner that the azo group and the carbonyl of said —N—CO— group, when respectively attached directly to the phenyl sulfamic acid radical, are joined thereto in meta position to the sulfamic acid group, and the N of the —N—CO— group, when attached directly to said phenyl sulfamic acid radical, is joined thereto in one of the positions meta and para to said sulfamic acid group, said compound containing no acidic water-solubilizing group other than said sulfamic acid group; treating the resulting dyed material with an aqueous nitrous acid solution to convert said sulfamic acid groups on the fiber to diazo groups, and developing with an aqueous solution of an azo coupling component containing no acidic water-solubilizing groups.

3. A process as defined in claim 2 wherein the the coupling component radicals represented by B are 1-azo-2-hydroxy-3-naphthoylamino radicals.

4. A process as defined in claim 2 wherein the coupling component radicals represented by B are α-azo-aceto-acetylamino radicals.

5. A process as defined in claim 2 wherein said coupling component radicals represented by B are 4-azo-5-pyrazolonyl radicals.

CHARLES HOWARD STRATTON.

REFERENCES CITED

The following references are of record in the file of this patent:

UNITED STATES PATENTS

| Number | Name | Date |
|---|---|---|
| 1,183,378 | Heidenseich | May 16, 1916 |
| 1,505,569 | Laska | Aug. 19, 1924 |
| 1,737,905 | Zitscher | Dec. 3, 1929 |
| 1,857,230 | Zitscher | May 10, 1932 |
| 1,877,303 | Grether | Sept. 13, 1932 |
| 2,164,785 | Rossander | July 4, 1939 |
| 2,267,770 | Glahn | Dec. 30, 1941 |
| 2,283,829 | Suckfull | May 19, 1942 |
| 2,394,246 | Lecher | Feb. 5, 1946 |

FOREIGN PATENTS

| Number | Country | Date |
|---|---|---|
| 801,094 | France | May 16, 1936 |
| 262,987 | Great Britain | Dec. 23, 1926 |